United States Patent Office 3,706,785
Patented Dec. 19, 1972

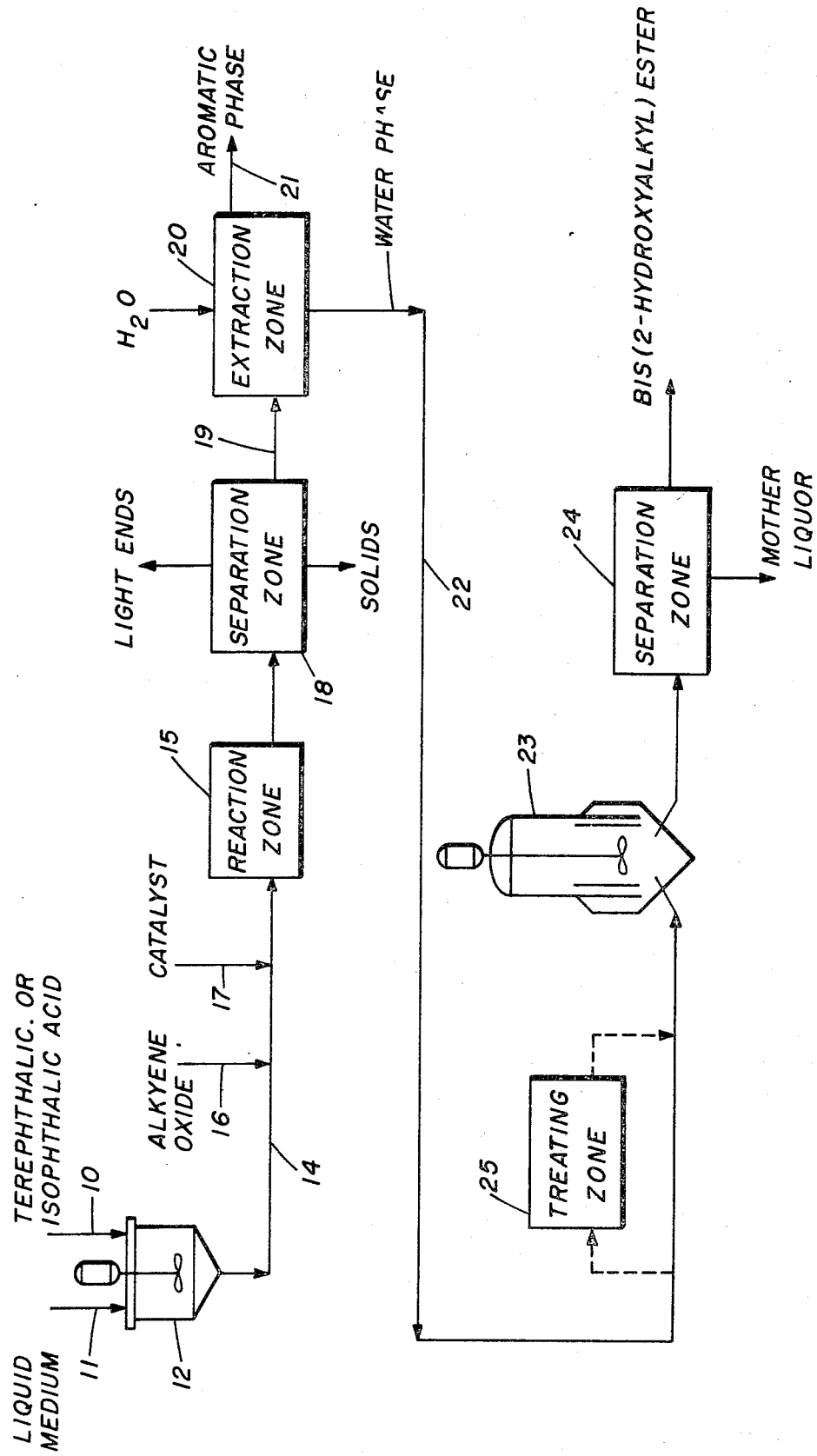

3,706,785
PREPARATION OF BIS(2-HYDROXYALKYL) ESTERS OF TEREPHTHALIC OR ISO-PHTHALIC ACID
Donald R. Larkin, Corpus Christi, Tex., assignor to Celanese Corporation, New York, N.Y.
Continuation of abandoned application Ser. No. 728,541, May 13, 1968, which is a continuation-in-part of abandoned application Ser. No. 695,075, Jan. 2, 1968. This application Apr. 13, 1971, Ser. No. 133,728
Int. Cl. C07c 69/82
U.S. Cl. 260—475 PR
14 Claims

ABSTRACT OF THE DISCLOSURE

The preparation of bis(2-hydroxyalkyl terephthalate or isophthalate by reacting terephthalic acid or isophthalic acid with an alkylene oxide in an aromatic medium, followed by extraction of the thus formed diester from the aromatic medium with water and crystallization from the water. Treating steps such as hydrogenation and/or the addition of chemical treating agents may also be included.

BACKGROUND OF THE INVENTION

This application is a continuation of application S.N. 728,541, May 13, 1968, now abandoned, which is a continuation-in-part of the copending application of Donald R. Larkin, Ser. No. 695,075, filed Jan. 2, 1968, entitled "Preparation of Bis-(2-Hydroxyethyl) Terephthalate," now abandoned.

The present invention relates to bis(2-hydroxyalkyl) terephthalate or isophthalate. More particularly, the present invention relates to a process for the production of bis(2-hydroxyalkyl) terephthalate or isophthalate from an alkylene oxide and terephthalic acid or isophthalic acid.

In recent years the production of linear super polyesters such as poly(ethylene terephthalate) has become of significant commercial interest. These polyesters may be produced by a variety of methods one of which is the polymerization of a bis-hydroxyalkyl ester of a benzene dicarboxylic acid such as bis(2-hydroxyethyl) terephthalate. Since it is highly desirable that these super polyesters be free of any significant discoloration it is necessary to use a diester starting material that is substantially free of any impurities which contribute to the discoloration of the polyester. Furthermore it is desirable that the starting material be substantially free of any monofunctional impurities which would serve as chain stopping agents and thus inhibit formation of the desirable high molecular weight polyester. It is for this reason that many processes have been devised for the production of high purity bis(2-hydroxyalkyl) isophthalate or terephthalate. For example, the preparation of these diesters by the reaction of terephthalic or isophthalic acid and ethylene glycol, by the reaction of salts of the diacids with ethylene chlorohydrin, and by the reaction of the diacids with alkylene oxides have been reported in the literature.

Perhaps the most common method of obtaining the diester monomers is by the reaction of terephthalic or isophthalic acid with an alkylene oxide, the dicarboxylic acid having been derived from the oxidation of the corresponding xylene. Some of the major troublesome impurities in the diester monomers are derived from those found in the dicarboxylic acid starting material such as 4-carboxybenzaldehyde and/or p-toluic acid in the case of terephthalic acid, and 3-carboxybenzaldehyde and/or m-toluic acid in the case of isophthalic acid. During the course of the preparation of a diester from a dicarboxylic acid containing these impurities, the impurities are usually converted to their hydroxyethyl esters. Methods have been devised in the prior art for getting rid of these impurities, however, these methods generally involve several expensive and time consuming crystallization steps and therefore the prior art processes are generally unsatisfactory for production of high purity diesters from "crude" terephthalic or isophthalic acid. Of course, it is understood by those in the art that the amount of impurities htatmay —dtWin the art that the amount of impurities that may be tolerated in the bis-hydroxyalkyl ester is very small and therefore a "crude" diacid may have a purity higher than 99%.

All of the impurities in bis-hydroxyalkyl esters of terephthalic or isophthalic acids do not originate in the acid feed as some impurities originate in the course of synthesizing the diester. For example, where terephthalic acid and ethylene oxide are reacted in an aqueous system to form bis(2-hydroxyethyl) terephthalate almost all of the unreacted ethylene oxide will hydrolyze to ethylene glycol or diethylene glycol both of which are undesirable impurities. Furthermore, this hydrolysis results in loss of valuable ethylene oxide that cannot be recycled for further use. The use of an inert, non-aqueous reaction medium eliminates the problem of losses of ethylene oxide through hydrolysis but prior art processes of this type also have disadvantages of loss of expensive reaction media in crystallizers and filters and of catalyst contamination in the product diester. Also non-aqueous systems of the prior art generally require expensive refrigeration equipment for crystallization, etc.

SUMMARY

It is thus an object of the present invention to provide a process for the production of a bis-hydroxyalkyl ester from terephthalic or isophthalic acid and an alkylene oxide, which process is relatively free of the foregoing disadvantages. More particularly, it is an object of the present invention to provide a relatively simple process for the production of high purity bis(2-hydroxyethyl) terephthalate, which process can utilize "crude" terephthalic acid. Additional objects of the present invention will become apparent from the following description.

These and other objects are accomplished by the present invention which in one of its embodiments is a process for preparing a diester which is bis(2-hydroxyalkyl) terephthalate and/or bis(2-hydroxyalkyl) isophthalate comprising the steps of (a) suspending a dicarboxylic acid which is terephthalic acid, isophthalic acid or mixtures thereof in an inert, liquid, aromatic medium, said aromatic medium being a solvent for said diester and a nonsolvent for said dicarboxylic acid, (b) reacting in a reaction zone the thus suspended dicarboxylic acid with an alkylene oxide in the presence of a catalyst and at a temperature of 100 to 200° C. so as to form said diester, (c) passing the reaction zone effluent to a separation zone and removing therefrom a liquid stream consisting essentially of said aromatic medium and said diester, said reaction zone effluent, said separation zone, and said liquid stream being maintained at a temperature which is at least 100° C. and which is sufficient to keep said diester in liquid form, (d) passing said liquid stream removed from said separation zone to an extraction zone wherein said liquid stream is intimately contacted with water and a water phase and an aromatic phase are formed, the amount and temperature of the water being such that said water phase is at a temperature of at least 60° C. and being an amount of water which at the temperature of said water phase would dissolve the amount of diester entering said extraction zone, (e) withdrawing said water phase from said extraction zone, passing the same to a crystallization zone and crystallizing the diester therefrom, and (f) removing the thus crystallized diester.

BRIEF DESCRIPTION OF THE FIGURE

The sole figure represents a flow diagram of a process in accordance with the present invention wherein a dicarboxylic acid and an alkylene oxide are reacted to form bis(2-hydroxyethyl) terephthalate.

DESCRIPTION OF THE PREFERRED EMBODIMENTS

In order to more fully describe the present invention, reference is now made to the figure for an example of one method of carrying out the present invention. The particular dicarboxylic acid being used and an inert, liquid aromatic medium are added through lines 10 and 11, respectively, to a slurry tank 12 so as to form a slurry of the dicarboxylic acid in the aromatic medium. This is preferably accomplished by adding the dicarboxylic acid in powdered or finely divided form to the aromatic liquid medium and suspending the acid by agitation. The amount of aromatic medium to be used will generally be from about 1 to 40, preferably to about 2 to 15, times the weight of the terephthalic acid used. The slurry is then passed through line 14 to reaction zone 15, an alkylene oxide having been added to the slurry through line 16 and a catalyst having been added through line 17. The amount of alkylene oxide to be used in the present invention should generally be in the range of from about 1.7 to 4.0 moles of alkylene oxide per mole of dicarboxylic acid with the preferred range corresponding to about 2.4 to 3.1 moles of alkylene oxide per mole of terephthalic acid. Suitable alkylene oxides include those vicinal epoxides having from 2 to 6 carbon atoms such as 1,2 butylene oxide and 1,2 propylene oxide with ethylene oxide being preferred.

The catalyst to be used is preferably one which is soluble in the aromatic medium being used, that is one which is itself soluble or which forms salts, complexes, compounds, etc., which are soluble. Some specific classes of catalyst which may be used in the present invention are amines, arsines, stibines, phosphines, or quaternary ammonium compounds. The preferred class of catalyst are the amines, especially the tertiary amines such as pyridine, triethylamine, tri-n-propylamine, N,N'-dimethylaniline, 2,6-dimethylpyridine, and the like. Some other specific catalysts which may be used include propyl amine, hexyl amine, diethyl amine, piperidine, triethylphosphine, tripropylphosphine, diethylphenylphosphine, triphenylarsine, triphenylstibine, benzyl trimethyl ammonium hydroxide, decyl trimethyl ammonium hydroxide, and dodecyl trimethyl ammonium hydroxide. The amount of catalyst to be used in the process of the present invention should generally be from about 0.001 to 0.2 mole per mole of the dicarboxylic acid but is preferably from about 0.01 to 0.1 mole per mole of the dicarboxylic acid.

Reaction zone 15 may be composed of one or more reactors, the particular reactor configuration not being a part of the present invention. The reaction zone should generally be maintained at a temperature of from about 100° C. to 200° C., preferably 110 to 180° C. The pressure in the reaction zone should be sufficient to maintain the reactants as well as the aromatic reaction medium in the liquid phase and will generally be from 50 to 400 p.s.i.g. Nitrogen or other inert gases may be added in order to maintain the desired pressure. The residence time of the reactants in the reaction zone should be on the order of from 2 to 60 minutes and the reactants are generally maintained in the reaction zone until about 60 to 98% of the diacid has reacted, but preferably until about 80–96% has reacted.

Still referring to the drawing, the effluent of reaction zone 15 is sent to separation zone 18. In separation zone 18 any unreacted alkylene oxide and/or dicarboxylic acid are separated from the bis-hydroxyalkyl diester formed in the reaction zone and from the liquid aromatic reaction medium. In transferring the effluent of reaction zone 15 to separation zone 18 and in operating separation zone 18, it is important that the temperature be at least 100° C., preferably 110° to 180° C., and also sufficiently high to keep the diester in liquid form. Generally no heat needs to be supplied in order to accomplish this but an insulated line between reaction zone 15 and separation zone 18 will usually be required. By requiring that the diester be in liquid form is meant that all of the diester in the effluent and the separation zone be either in solution in the aromatic medium, or where the solubility limits of the aromatic medium have been exceeded for the particular temperature, be present as a melt or molten diester phase. In the latter case there would be two liquid phases one being a saturated solution of the diester in the liquid medium and the other being essentially molten diester but also containing some small amounts of liquid medium. When two such phases exist, the temperature generally does not have to be kept above the melting point of the diester in order to keep the molten diester phase liquid because the presence of the aromatic medium apparently depresses the melting point somewhat. For example the melting point of bis(2-hydroxyethyl) terephthalate is around 110° C. and yet the temperature of a two phase liquid system, one of the phases being a solution of the terephthalate in xylene and the other being a molten diester phase, may be lowered to about 100° C. before the terephthalate begins to crystallize out of the molten diester phase. Since the melting temperature of bis(2-hydroxyethyl) terephthalate is about 110° C., maintenance of both the reaction zone effluent and separation zone 18 above 110° C. will insure that terephthalate is always in liquid form. Of course, if the solubility limits of the aromatic medium are exceeded while operating above 110° C. the above mentioned two phase liquid system will exist. It is especially preferred to operate the present invention such that all of the diester in the reaction zone effluent and in separation zone 18 be in solution such that a single liquid phase exists. In order to assure that the diester be in liquid form it is sometimes necessary to add aromatic reaction medium (usually preheated to avoid excessive cooling upon addition) to the effluent of the reaction zone.

The particular manner of separating the reaction zone effluent does not constitute a part of the present invention and various methods will be apparent to those skilled in the art. For example, separation zone 18 could contain a flash tower for removing alkylene oxide from the effluent together with a centrifuge to separate the solid benzene dicarboxylic acid from the liquid phase comprised of a solution of diester in liquid aromatic reaction medium and in some cases, molten diester. Alternatively a centrifuge capable of effecting a solid-liquid-gas separation could be utilized which (assuming of course that the pressure of the system had been reduced so that the alkylene oxide was in the gaseous state) would separate the reaction zone effluent into gaseous alkylene oxide, solid dicarboxylic acid, and a liquid stream of diester and aromatic reaction medium. Actually the only necessary function of separation zone 18 is to isolate a liquid stream consisting of the diester and aromatic medium so that this liquid stream can be further processed in accordance with the present invention. However, it is obvious that it would generally be desirable from an economic standpoint to have any unreacted alkylene oxide and/or dicarboxylic acid separated into separate streams for recycle to the reaction zone. Additional aromatic medium could also be added to the liquid stream withdrawn from separation zone 18 without departing from the present invention.

Upon being separated from the effluent of reaction zone 15, the liquid stream consisting of diester and aromatic medium is sent through line 19 to extraction zone 20 wherein the liquid stream is intimately contacted with water. It is critical to the present invention that the temperature of the liquid transferred through line 19 to extraction zone 20 be at least 100° C. and be at a temperature sufficient to maintain the diester in liquid form. Thus the liquid stream transferred to the extraction zone of the present invention will be either a single liquid phase comprising the diester formed in the reaction zone in solution in the aromatic medium or a two phase liquid, one phase being an aromatic solution of diester and the other being a molten diester phase. However, it is especially preferred that all the diester be in solution and that a single liquid phase exist. The exact temperature needed to maintain the diester in solution will of course vary according to the particular diester and the particular aromatic medium being used and will also vary according to the concentration of the diester. However this temperature is preferably between 110° C. and 180° C. As in the case where the effluent from reaction zone 15 was transferred to separation zone 18 no external heat will generally be required to keep the diester in liquid form and properly insulated lines will usually be sufficient to maintain the proper temperatures.

Upon intimately contacting the diester-containing liquid stream with water in extraction zone 20, a water phase and a phase comprised of the aromatic reaction medium will be formed with the diester being extracted from the aromatic phase into the water phase. Any diester present in the liquid stream as a melt will be dissolved in the water phase. The aromatic phase is then removed through line 21 while the water phase containing the diester dissolved therein is removed through line 22 for further processing in accordance with the present invention. The amount of and the temperature of the water added to extraction zone 20 should be such that the temperature of the water phase which results after mixing the water and the liquid stream 19 and which is removed from the extraction zone 20 through line 22 is between 60° C. and 140° C., preferably between about 80° C. and 130° C. When the diester is bis(2-hydroxyethyl) terephthalate and the liquid medium is an alkylbenzene the especially preferred temperature range is 100° C.–125° C. It will be apparent that the aromatic phase should also be at about the same temperature as the water phase because the two phases should be at an equilibrium temperature reached after the intimate contact of liquid stream 19 and the water. The amount of water added to extraction zone 20 must not only be an amount and at such a temperature to cause the water phase removed from the extraction zone to be within the proper temperature range, but must also be an amount of water which at the temperature of the water phase (line 22) would dissolve all the diester entering extraction zone 20. This is not to say that 100% of the diester entering the extraction section leaves in the water phase but means that the amount of water fed to the extraction zone and contacted with the diester-containing liquid should be an amount which would be capable of dissolving that amount of diester if the water were at the temperature of the water phase which is withdrawn from the extraction zone. As an example, the solubility of bis(2-hydroxyethyl) in water at 60° C. is about 30% by weight based on the combined weight of water and diester and therefore if bis(2-hydroxyethyl) terephthalate were being passed to the extraction zone at a rate of 30 pounds per hour and the water phase were being withdrawn at 60° C., then at least 70 pounds per hour of water would have to be fed to the extraction zone. Generally the amount of water used should be such that the weight ratio of water to diester entering the extraction zone is from about 1:1 to 50:1 and preferably the amount of water is such that the water phase removed from extraction zone 20 contains in solution between about 3 and 40 percent by weight of the diester, e.g., 8 to 30% by weight. The aromatic phase which is removed through line 21 will generally be sent to clean-up and recovery so that it can be reused. By conducting the process according to the present invention it has been found that the aromatic phase which is removed from extraction zone 20 will contain very little diester product while it unexpectedly retains practically all the 2-hydroxyethyl toluate impurities which were formed. Also large amounts of other impurities such as the hydroxyethyl ester of carboxybenzaldehyde will be removed. As was pointed out above both of these particular impurities generally originate in the dicarboxylic acid feed in the acid form and are then hydroxyethylated in the reaction zone.

Various methods to accomplish the intimate contact of the water with the diester-containing liquid stream in extraction zone 20 will be immediately obvious to those skilled in the art. One method to accomplish the contact and extraction is to use countercurrent extraction in one or more mixer-settlers. Also such equipment as spray and packed extraction towers, perforated plate towers, baffle towers, agitated tower extractors, pulse columns, centrifugal extractors and the like may be utilized.

After being removed from extraction zone 20, the aqueous solution of the bis-hydroxyalkyl ester is passed to a crystallization zone as represented by crystallizer 23 wherein the diester is crystallized generally leaving various impurities and/or treating agents in the aqueous mother liquor. Impurities removed at this stage include those derived from the catalyst used in the reaction zone such as nitrogen-containing compounds. The effluent of crystallizer 23 is then sent to a second separation zone 24 wherein the crystals are separated from the mother liquor. The crystallization can be effected for example by cooling the aqueous solution of diester to between about 10° C. and 35° C., while the separation zone 24 may be conveniently accomplished by filtration, decantation, centrifugation or the like. If desired the separated crystals can be given a final washing with fresh water to remove the last traces of the mother liquor containing the impurities.

The foregoing has been a description of one embodiment of the present invention and it is understood that various purification or treating steps can be added without departing from the present invention. For example, referring to the drawing, the aqueous solution of diester withdrawn from extraction zone 20 could, instead of being sent directly to crystallizer 23, be subjected to some sort of purification treatment in treating zone 25. There are numerous methods known in the prior art for treating such aqueous solutions of diesters to remove various impurities and practically any of these could be utilized in the present invention. Many of these methods involve the addition of treating agents which cause the impurities, especially the hydroxyethyl ester of carboxybenzaldehyde, to be converted to a more soluble form so that they will not crystallize so readily with the bis-hydroxyalkyl ester. These more soluble forms of the impurities may be salts, adducts, or even other compounds. For example, U.S. Pat. No. 3,239,556 to Robert D. Slockett, Mar. 8, 1966, described a method for removing aldehyde impurities from aqueous solutions of bis(2-hydroxyethyl) terephthalte by adding at least two percent by weight of a bisulfite or sulfite treating agent prior to crystallizing the terephthalate. Thus treating zone 25 could merely consist of a means for adding an alkali metal sulfite or bisulfite to the aqueous solution of the diester prior to its entering crystallizer 23. Another treating method which has been found to be especially beneficial in removing impurities is treatment of the diester, preferably in aqueous solution, with activated carbon. This may be accomplished by passing an aqueous solution of diester through a bed of activated charcoal and may be utilized in conjunction with other type treatments. Another type of purification treatment that may be used in treating zone 25 includes the reduction of impurities in aqueous solution with gaseous hydrogen in the presence of platinum, palladium, rhodium, rubidium, nickel, and cobalt catalysts as disclosed in French Pat. 1,479,925 to Sumitomo Chemical Company, Mar. 28, 1967. Also see British Pat. No. 760,027 to Imperial Chemical Industries, Oct. 31, 1956, for a method of treating aqueous solutions of bis-hydroxyalkyl esters with sodium hyposulfite.

Treating zone 25 is shown as being between extraction zone 20 and crystallizer 23, however, it is also within the scope of the present invention to utilize treating zones at other places in the process instead of or in addition to treating zone 25. Thus, the crystallized product removed from separation zone 24 may be treated in various manners before a final product is obtained. For example the crystallized product removed from separation zone 24 may have a moisture content of about 25 to 50% such that these crystals can be heated to around 90° C. to form an aqueous solution which can be treated such as by treatment with activated charcoal, and then the diester product recovered by various methods. It is also within the scope of the present invention to use more than one crystallization zone in order to increase the purity of the diester.

The non-aqueous inert aromatic reaction medium used in the present invention will generally be a mononuclear aromatic free of ethylenic and acetylenic unsaturation and may have substituents inert to oxidation such as halogens and nitro groups. For best results the liquid medium should have a normal boiling point between about 100° C. and 170° C. although the preferred boiling range is between about 112 and 155° C. Aromatics having a lower boiling point will require excessive pressure to keep them in liquid form in the reaction zone. The preferred aromatic mediums are mononuclear aromatic hydrocarbons free of ethylenic and acetylenic unsaturation or mononuclear aromatic halohydrocarbons free of ethylenic and acetylenic unsaturation, especially those having from 6 to 9 carbon atoms. Hydrocarbons are preferred over the halohydrocarbons as the halohydrocarbons can present corrosion problems and do not remove impurities as well as the hydrocarbons. Some particular solvents which may be used include toluene, o-xylene, m-xylene, p-xylene, ethylbenzene, chlorobenzene, nitrobenzene, nitrotoluene, m-ethyltoluene, o-chlorotoluene, cumene, and the like. Mixtures of these aromatics may also be used such as mixed xylenes or a $C_8$ alkylbenzene stream such as is obtained in the cracking of petroleum having a mixture of ethylbenzene along with the xylenes, and in some cases small quantities of styrene. The especially preferred aromatic medium to be utilized in the process of the present invention is a $C_8$ alkylbenzene medium containing at least 60% xylene. The word "xylene" as used herein is intended to cover o-, m-, and p-xylene, each alone or in combinations with each other.

The following examples are given in order to illustrate but not to limit the present invention.

EXAMPLE I

Crude terephthalic acid containing about 0.4% by weight of 4-carboxybenzaldehyde and 0.4% by weight of p-toluic acid impurities is added to a $C_8$ alkylbenzene reaction medium composed of 20% ethylbenzene, 21% of o-xylene, 38% m-xylene and 21% p-xylene so as to form a slurry containing about 10% by weight of terephthalic acid. Ethylene oxide in an amount corresponding to about 2.5 moles per mole of terephthalic acid and triethylamine in an amount corresponding to about 2% by weight of the terephthalic acid is then added to the slurry and the total reaction mixture sent to a reactor. The reactor consists of a long pipe having a length to diameter ratio of about 4000:1 and is maintained at a temperature of about 140° C. and a pressure of about 200 p.s.i.g. The residence time of the reaction mixture in the reactor is about 15 minutes such that approximately 90% of the terephthalic acid is reacted. The effluent of the reactor which is comprised of unreacted ethylene oxide, unreacted terephthalic acid and the $C_8$ alkylbenzene reaction medium having about 15% by weight of bis(2-hydroxyethyl) terephthalate dissolved therein is sent to a flash tower operating at about 140° C. and atmospheric pressure in order to remove the ethylene oxide. The remaining solution of bis(2-hydroxyethyl) terephthalate in the $C_8$ alkylbenzenes along with the solid, unreacted terephthalic acid is diluted with additional $C_8$ alkylbenzene and then passed at a temperature of 140° C. to a centrifuge wherein the two are separated. The centrate consisting of a single liquid phase of about 7.5% weight percent of bis(2-hydroxyethyl) terephthalate in solution in the $C_8$ alkylbenzene is then passed at a temperature of 120° C. to an extraction zone via a centrate receiver.

In the extraction zone the terephthalate is extracted from $C_8$ alkylbenzene by counter-current extraction with water in three mixer-settlers. The water fed to the extraction zone is at a temperature of about 65° C. and the water phase removed from the extraction zone having about 10 weight percent terephthalate dissolved therein is at a temperature of about 90° C. The aromatic phase contains about 0.5% by weight of the terephthalate.

The aqueous solution of bis(2-hydroxyethyl) terephthalate removed from the extraction zone is next passed through a bed of activated charcoal and then fed to a crystallizer operating at about 25° C. and 24 mm. Hg A so as to crystallize the terephthalate. The crystallized terephthalate is then removed from the mother liquor in a rotary drum filter. The diester so recovered is white and suitable for fiber forming.

EXAMPLE II

The experiment of Example I is substantially repeated except that the carbon treatment is omitted and substituted with a hydrogenation treatment whereby the aqueous solution of bis(2-hydroxyethyl) terephthalate removed from the extraction zone is hydrogenated at a temperature of about 80° C. with gaseous hydrogen using a palladium on carbon catalyst. The diester product recovered is white and suitable for fiber forming.

EXAMPLE III

The process of Example I is substantially repeated except that the carbon treatment is omitted and the extraction zone contains seven mixer-settlers for counter-current extraction. The bis(2-hydroxyethyl) terephthalate product recovered is white and suitable for fiber forming.

EXAMPLE IV

The procedure of Example I is substantially repeated except that the charcoal treatment following the extraction zone is omitted. However, an amount of sulfurous acid corresponding to about 0.10 weight percent is added to the water phase withdrawn from the extraction zone prior to its entering the crystallizer. Also the wet crystals recovered from the rotary drum filter are heated to about 90° C. so as to form a 70 weight percent aqueous solution of terephthalate and the aqueous solution passed through a bed of activated charcoal. The effluent of the activated charcoal bed is then passed to a water flasher operating at 120° C. and 120 mm. Hg A pressure and then to a drum flaker. The diester product recovered is white and suitable for fiber forming.

EXAMPLE V

The experiment of Example I is repeated except that the water fed to the extraction zone is at about 95° C. As a result of this increased temperature, the water phase removed from the extraction zone is at a temperature of about 112° C. and contains about 20 weight percent bis(2-hydroxyethyl) terephthalate while the aromatic phase contains only about 0.3 weight percent of the diester. In this experiment the extraction zone is maintained at about 20 p.s.i.g. because water and xylene form an azeotrope which boils at about 92.3° C.

I claim:

1. A process for preparing a diester which is bis(2-hydroxyalkyl) terephthalate and/or bis(2-hydroxyalkyl) isophthalate comprising the steps of (a) suspending a dicarboxylic acid which is terephthalic acid, isophthalic acid or mixtures thereof which contains carboxybenzaldehyde and/or toluic acid impurities in an inert, liquid, aromatic medium having a normal boiling point of from 100° C. to 170° C., said aromatic medium being a solvent for said diester and a non-solvent for said dicarboxylic acid, (b) reacting in a reaction zone the thus suspended dicarboxylic acid with a vicinal epoxide having from 2–6 carbon atoms in the presence of a catalyst and at a temperature of 100 to 200° C. so as to form said diester, (c) passing the reaction zone effluent to a separation zone and removing therefrom a liquid stream consisting essentially of said aromatic medium and said diester, said reaction zone effluent, said separation zone, and said liquid stream being maintained at a temperature which is at least 100° C. and which is sufficient to keep said diester in liquid form, (d) passing said liquid stream removed from said separation zone to an extraction zone wherein said liquid stream is intimately contacted with water and a water phase and an aromatic phase are formed, the amount and temperature of the water being such that said water phase is at a temperature of at least 60° C. and being an amount of water which at the temperature of said water phase would dissolve the amount of diester entering said extraction zone, (e) withdrawing said water phase from said extraction zone, passing the same to a crystallization zone and crystallizing the diester therefrom, and (f) removing the thus crystallized diester.

2. The process of claim 1 wherein said liquid stream removed from said separation zone is a single phase liquid stream comprising a solution of said diester in said aromatic medium.

3. The process of claim 2 wherein the temperature of said water phase is about 80 to 130° C.

4. The process of claim 1 wherein the amount of water utilized in said extraction zone is such that the weight ratio of water to diester entering said extraction zone is from about 1:1 to 50:1.

5. The process of claim 1 wherein said catalyst is a tertiary amine or a quaternary ammonium compound.

6. The process of claim 1 wherein said aromatic medium is a $C_8$ alkylbenzene medium containing at least 60% by weight xylene.

7. The process of claim 1 wherein said water phase is subjected to a hydrogenation treatment prior to being passed to said crystallization zone.

8. The process of claim 1 wherein said alkylene oxide is ethylene oxide, wherein said dicarboxylic acid is terephthalic acid and wherein said diester is bis(2-hydroxyethyl)terephthalate.

9. The process of claim 1 wherein said dicarboxylic acid and said alkylene oxide are reacted at a temperature of from about 110 to 180° C. and wherein said liquid stream removed from first separation zone is at a temperature of from about 110 to 180° C.

10. A process for preparing bis(2-hydroxyethyl)terephthalate comprising the steps of (a) suspending terephthalic acid which contains carboxybenzaldehyde and/or toluic acid impurities in 1 to 40 times its weight of a $C_8$ alkylbenzene liquid medium, (b) reacting in a reaction zone the thus suspended terephthalic acid with an alkylene oxide in the presence of a catalyst and at a temperature of 110 to 180° C. so as to form said diester, said catalyst being a tertiary amine or quaternary ammonium compound, (c) passing the reaction zone effluent to a separation zone and removing therefrom a liquid stream consisting essentially of said liquid medium and bis(2-hydroxyethyl) terephthalate, said reaction zone effluent, said separation zone, and said liquid stream being maintained at a temperature which is at least 100° C. and which is sufficient to keep said bis(2-hydroxyethyl) terephthalate in liquid form, (d) passing said liquid stream removed from said separation zone to an extraction zone wherein said liquid stream is intimately contacted with water and a water phase and an aromatic phase are formed, the amount and temperature of the water being such that said water phase is at a temperature of 80 to 130° C. and being an amount of water which at the temperature of said water phase would dissolve the amount of bis(2-hydroxyethyl) terephthalate entering said extraction zone, (e) withdrawing said water phase from said extraction zone, passing the same to a crystallization zone and crystallizing bis(2-hydroxyethyl) terephthalate therefrom, and (f) removing the thus crystallized bis(2-hydroxyethyl) terephthalate.

11. The process of claim 10 wherein said catalyst is a tertiary amine.

12. The process of claim 10 wherein the amount of water contacted with said liquid stream is an amount and at a temperature such that said water phase is at a temperature of about 100 to 125° C. and contains from about 8 to 30% by weight of bis(2-hydroxyethyl) terephthalate.

13. The process of claim 10 wherein said water phase withdrawn from said extraction zone is subjected to a hydrogenation treatment prior to being passed to said crystallization zone.

14. The process of claim 10 wherein an alkali metal sulfite or bisulfite is added to said water phase withdrawn from said extraction zone prior to its being passed to said crystallization zone, said sulfite or bisulfite being added in an amount sufficient to convert the hydroxyethyl ester of 4-carboxybenzaldehyde to a more water soluble form.

References Cited

UNITED STATES PATENTS

| 3,037,049 | 5/1962 | Vaitekunas | 260—475 |
| 3,239,556 | 3/1966 | Slockett | 260—475 |
| 3,459,788 | 8/1969 | Enoki et al. | 260—475 |

FOREIGN PATENTS

| 1,479,925 | 3/1967 | France | 260—475 |

LORRAINE A. WEINBERGER, Primary Examiner

E. J. SKELLY, Assistant Examiner

U.S. Cl. X.R.

260—475 P